No. 730,328. PATENTED JUNE 9, 1903.
G. A. WOODMAN.
JOURNAL BEARING.
APPLICATION FILED MAY 26, 1902.
NO MODEL. 2 SHEETS—SHEET 1.
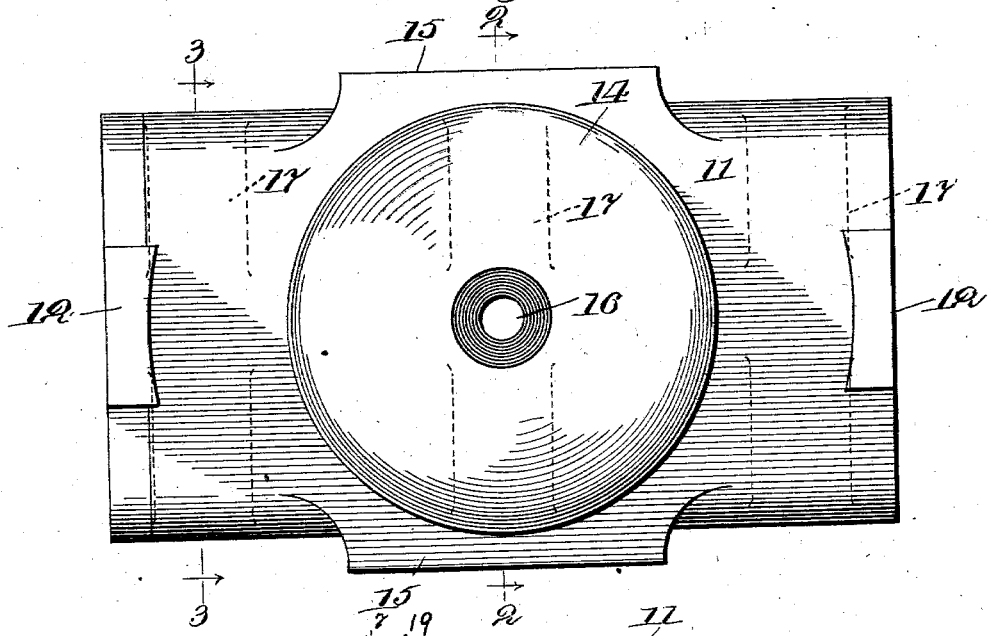

No. 730,328. PATENTED JUNE 9, 1903.
G. A. WOODMAN.
JOURNAL BEARING.
APPLICATION FILED MAY 26, 1902.
NO MODEL. 2 SHEETS—SHEET 2.
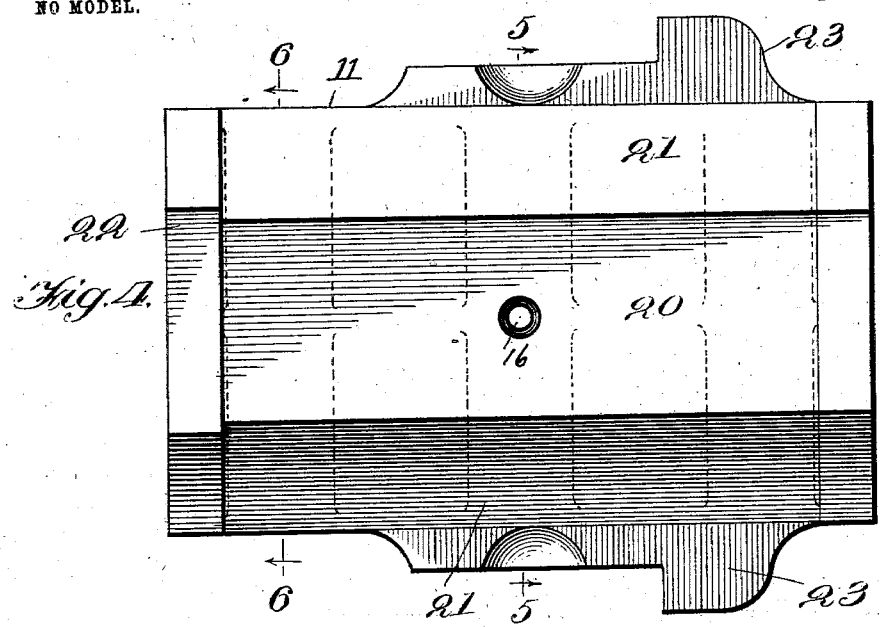
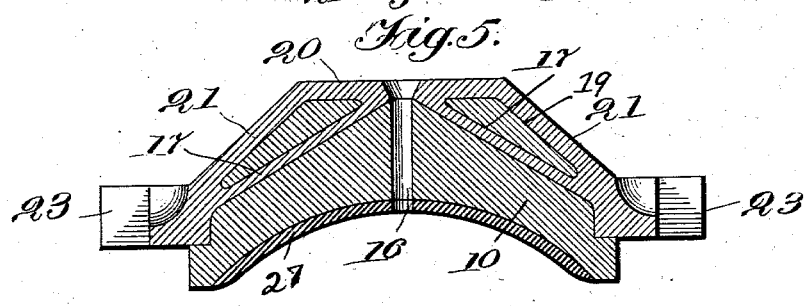
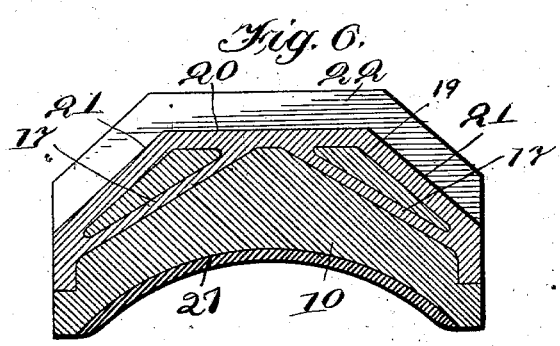
Witnesses:
H. S. Gaither
Helen L. Peck
Inventor:
George A. Woodman
by Wm. P. Belt
Attorney.

No. 730,328. Patented June 9, 1903.

UNITED STATES PATENT OFFICE.

GEORGE A. WOODMAN, OF CHICAGO, ILLINOIS, ASSIGNOR TO AUGUST J. WEIL, OF NEW YORK, N. Y.

JOURNAL-BEARING.

SPECIFICATION forming part of Letters Patent No. 730,328, dated June 9, 1903.

Application filed May 26, 1902. Serial No. 109,040. (No model.)

*To all whom it may concern:*

Be it known that I, GEORGE A. WOODMAN, a citizen of the United States, residing at Chicago, in the county of Cook and State of Illinois, have invented certain new and useful Improvements in Journal-Bearings, of which the following is a specification.

This invention relates to improvements in journal-bearings; and its primary object is to reduce the cost of manufacturing journal-bearings without impairing the strength or shortening the life of the bearing; and a further object is to provide a bearing with a back made of malleable iron or other suitable metal and a body of brass or other suitable metal and to lock the parts together, so that they will be thoroughly and permanently united.

In order that my invention may be fully understood, I will explain the same as embodied in a car-axle bearing of both the "Universal" and the Master Car-Builders' types; but I do not in any way limit myself to the embodiment of the invention in these or any other bearings, because it will be apparent that it may be used in connection with journal-bearings of many other varieties.

In the drawings, Figure 1 is a top plan view of a "Universal" car-axle bearing embodying the invention. Figs. 2 and 3 are transverse sectional views on the lines 2 2 and 3 3, respectively, of Fig. 1. Fig. 4 is a top plan view of a Master Car-Builders' bearing embodying my invention. Figs. 5 and 6 are transverse sectional views on the lines 5 5 and 6 6, respectively, of Fig. 4. Fig. 7 is a sectional view on the line 7 7 of Fig. 2.

It is my intention to provide a bearing consisting of a body 10, of suitable bearing metal, and a back 11, made of malleable iron or other suitable metal, whereby a bearing of the proper size and strength can be made with considerably less bearing metal than has heretofore been used and at much less expense. The back extends over the body between the end lugs 12 of the "Universal" bearing (shown in Fig. 1) and down on the sides of the body and is seated securely against the shoulders 13. The back is shaped to conform to the usual outline of this bearing and is provided at the center with a convex portion 14 and with side lugs 15 adjacent to said convex portion.

In order to unite and lock the back plate and the body securely together, I provide struts or bridges 17, extending from the depending sides 18 of the back to the top thereof, as clearly shown in the sectional views. Of course I may use any number of these struts or bridges and the size thereof may be varied, as found desirable; but I believe the desired results will be secured by using three pairs of struts or bridges, as indicated in broken lines in Fig. 1, one pair being located about the center of the bearing and another pair at or adjacent to each end thereof. I do not in any way confine myself to the use of any particular number of struts or bridges or to any particular arrangement thereof. The struts or bridges of each pair extend obliquely from the sides of the back to the top thereof, and the juncture of each strut or bridge with the top of the back may be located at a distance from the longitudinal center of the back, as shown in Fig. 3, or the upper ends of the struts or bridges may be brought close together, as shown in Fig. 6, these and other details of construction being susceptible of many variations to accommodate the invention to different circumstances.

In Figs. 4 to 6 I have shown the invention embodied in a standard Master Car-Builders' car-axle bearing, which is of well-known construction and has the flat top 20 and inclined sides 21 with a shoulder 22 at one end and the projecting lugs 23. The struts or bridges 17 are arranged in this bearing in substantially the same manner as heretofore described with relation to the "Universal" bearing, except that the struts of each pair are shown in Fig. 6 to approach closer to each other at the juncture with the top of the back; but it is apparent that this is a detail of construction which may be changed without departing in any way from the spirit of the invention.

A bearing embodying my invention may be made of other metals besides brass and malleable iron and may be provided with a lining 27 of Babbitt metal or other lubricating material and a central oil-opening 16, if desired; but this is not necessary.

It will be apparent to those skilled in the art that the use of a back made of malleable iron or other suitable metal will enable the production of a bearing at a great deal less cost than if the bearing is made of solid brass or other bearing metal in the manner now commonly followed. This will be accomplished also without in any way impairing the strength or shortening the life of the bearing, provided a perfect union of parts is effected, and this result is produced by my invention as herein set forth and described. The struts or bridges form pockets 19 between themselves and the top and sides of the back, in which the body metal flows in the casting operation and securely locks the body and back together, so that there can be no possibility of the back and body becoming loose or disconnected before the bearing is worn out.

I do not limit myself to the use of struts or bridges of the exact character herein shown and described nor to their arrangement only at the sides of the back, extending to the top thereof, but reserve the right to employ ribs or bridges of any kind and in any arrangement which may be found desirable for the purpose intended.

While I have shown and described the invention as embodied in a car-axle bearing, I do not limit myself to this particular use, because it will be apparent that it may be embodied in bearings of many different varieties and the same superior results effected.

Having thus fully described my invention, what I claim, and desire to secure by Letters Patent, is—

1. A journal-bearing comprising a body, and a back for the body having pockets formed in its under side to receive the body metal, said pockets being closed transversely but open longitudinally of the back.

2. A journal-bearing comprising a body, and a back for the body having pockets in its under side and at the corners formed by its sides and top to receive the body metal, said pockets being closed transversely but open longitudinally of the back.

3. A journal-bearing comprising a body, and a back for the body made of a different kind of metal, and angularly-arranged integral struts on the under side of the back forming pockets between themselves and the back to receive the body metal.

4. A journal-bearing comprising a body, a back for the body made out of a different kind of metal, and integral struts on the under side of the back and on both sides of the longitudinal center thereof forming pockets between themselves and the back to receive the body metal.

5. A journal-bearing comprising a body, a back for the body made of a different kind of metal and having depending sides, and integral struts on the under side of the back extending obliquely from the sides of the back to the top thereof, and forming pockets between themselves and the back.

GEORGE A. WOODMAN.

Witnesses:
R. D. HOPPING,
JAY E. VAN VLACK.